(12) United States Patent
Thomas et al.

(10) Patent No.: US 12,043,155 B2
(45) Date of Patent: Jul. 23, 2024

(54) VEHICLE CONSOLE HAVING DEPLOYABLE TABLE

(71) Applicant: Ford Global Technologies, LLC, Dearborn, MI (US)

(72) Inventors: Gregory Paul Thomas, Canton, MI (US); Glen D. Skinner, Westland, MI (US); Brian Robb, Ypsilanti, MI (US); Thomas Junior Luckett, Saline, MI (US); Ryan Welch, Ottawa Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 17/944,353

(22) Filed: Sep. 14, 2022

(65) Prior Publication Data

US 2024/0083321 A1    Mar. 14, 2024

(51) Int. Cl.
*B60N 3/00*     (2006.01)
*B60N 2/75*     (2018.01)
*B60R 7/04*     (2006.01)

(52) U.S. Cl.
CPC ............... *B60N 3/001* (2013.01); *B60N 2/77* (2018.02); *B60N 2/793* (2018.02); *B60N 3/002* (2013.01); *B60R 7/04* (2013.01)

(58) Field of Classification Search
CPC ........ B60N 2/793; B60N 3/001; B60N 3/002; B60N 2/77; B60N 2/773; B60R 7/04; B60R 2011/0007
USPC ...................................................... 296/24.34
See application file for complete search history.

(56) References Cited

U.S. PATENT DOCUMENTS

| | | | | |
|---|---|---|---|---|
| 6,032,587 | A * | 3/2000 | Salenbauch ............ | B60N 3/002 108/44 |
| 6,220,660 | B1 | 4/2001 | Bedro et al. | |
| 7,455,016 | B2 * | 11/2008 | Perin ........................ | B60N 2/79 312/307 |
| 7,607,726 | B2 * | 10/2009 | Orlo ........................ | B60N 2/206 297/188.05 |
| 7,798,072 | B2 * | 9/2010 | Becker ...................... | A47C 7/70 297/145 |
| 7,891,623 | B2 * | 2/2011 | Haddad .................. | B60N 3/102 248/311.2 |
| 7,931,322 | B2 * | 4/2011 | O'Brien ................. | B60N 2/793 296/37.8 |

(Continued)

FOREIGN PATENT DOCUMENTS

| | | |
|---|---|---|
| DE | 19947871 C1 | 3/2001 |
| DE | 102017211229 A1 | 1/2019 |
| DE | 102019130142 A1 | 5/2021 |

*Primary Examiner* — Jason S Morrow
(74) *Attorney, Agent, or Firm* — Vichit Chea; Price Heneveld LLP

(57) ABSTRACT

An armrest center console for a vehicle includes a housing defining a storage bin, a track assembly having a first and second tracks provided on opposite sides of the housing, and an armrest cover assembly supported on the housing and having a deployable table. The armrest center console also includes a linkage assembly coupling the armrest cover assembly to the first and second tracks, wherein the armrest cover assembly is configured to slide forward on the first and second rail and to rotate upward via the linkage assembly to deploy the deployable table.

20 Claims, 6 Drawing Sheets

(56) References Cited

U.S. PATENT DOCUMENTS

| | | | | |
|---|---|---|---|---|
| 8,002,323 | B2* | 8/2011 | Jones | B60R 7/04 |
| | | | | 296/37.1 |
| 10,632,889 | B2 | 4/2020 | Bywaters et al. | |
| 10,919,426 | B1* | 2/2021 | Campagnone | B60R 7/04 |
| 11,225,182 | B2* | 1/2022 | Lee | B60N 3/102 |
| 11,279,269 | B1* | 3/2022 | Deng | B60N 2/753 |
| 11,485,266 | B1* | 11/2022 | Nageshkar | B60N 2/995 |
| 2004/0217615 | A1* | 11/2004 | Lindstrom | B60R 7/04 |
| | | | | 224/275 |
| 2022/0063504 | A1* | 3/2022 | Hodgson | B60R 7/04 |
| 2024/0109496 | A1* | 4/2024 | Bhujade | B60R 7/04 |

* cited by examiner

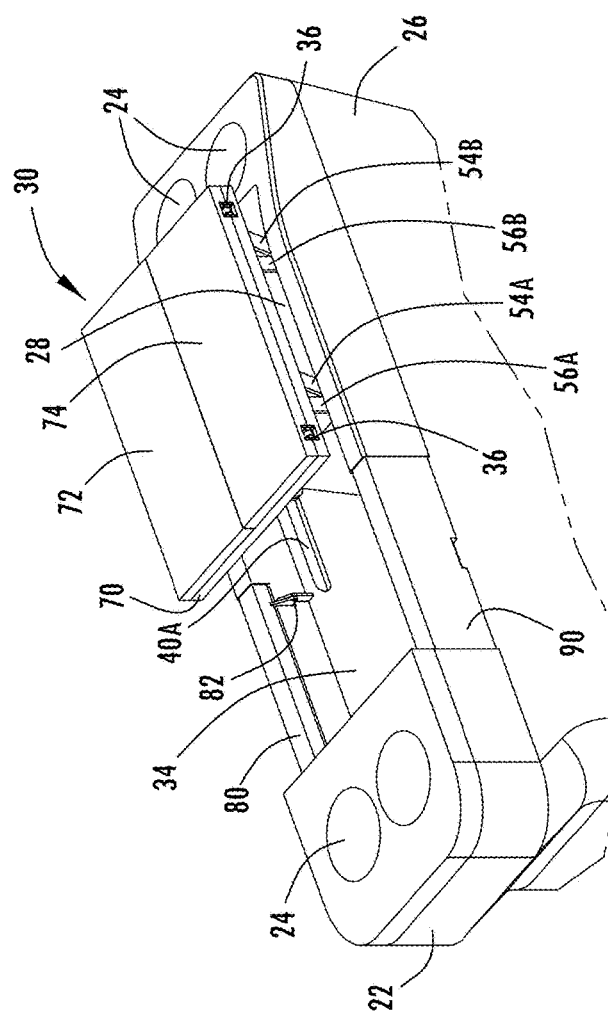
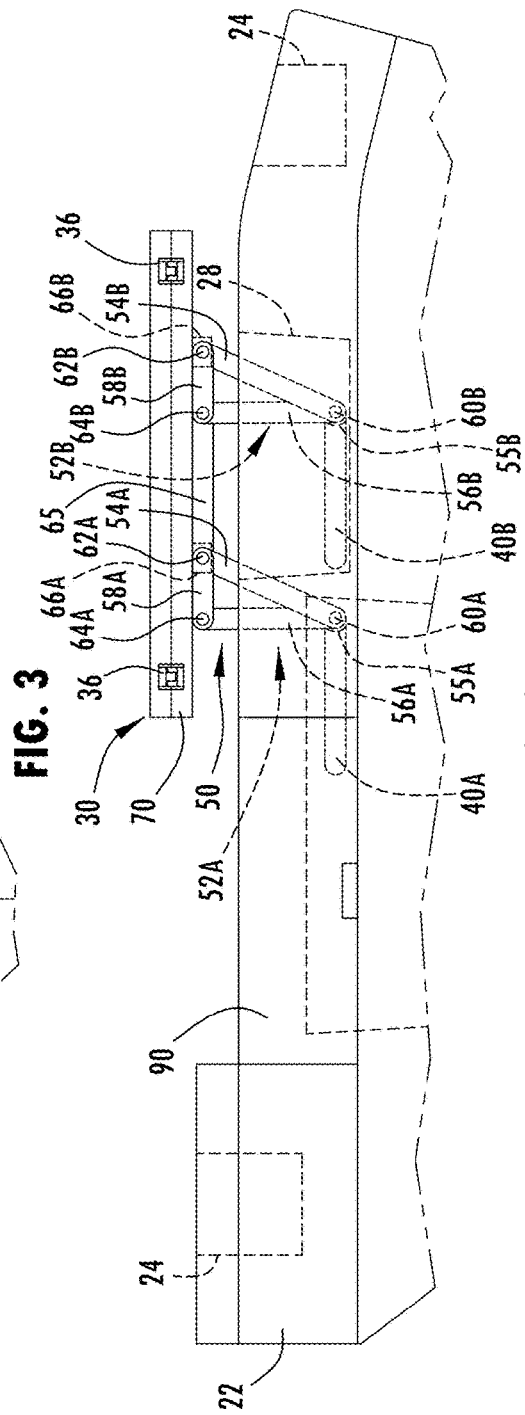

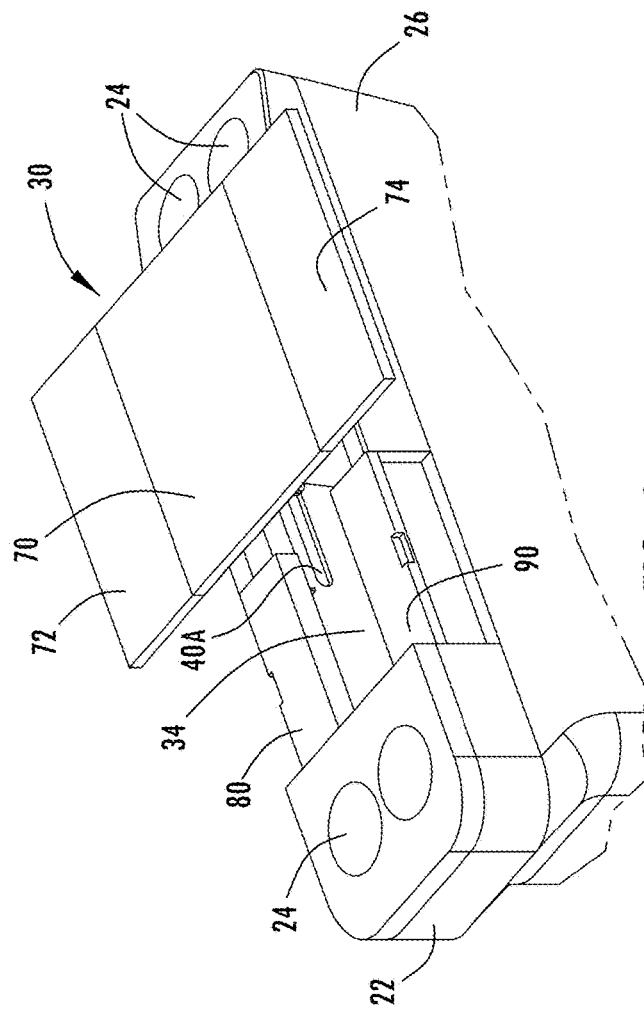
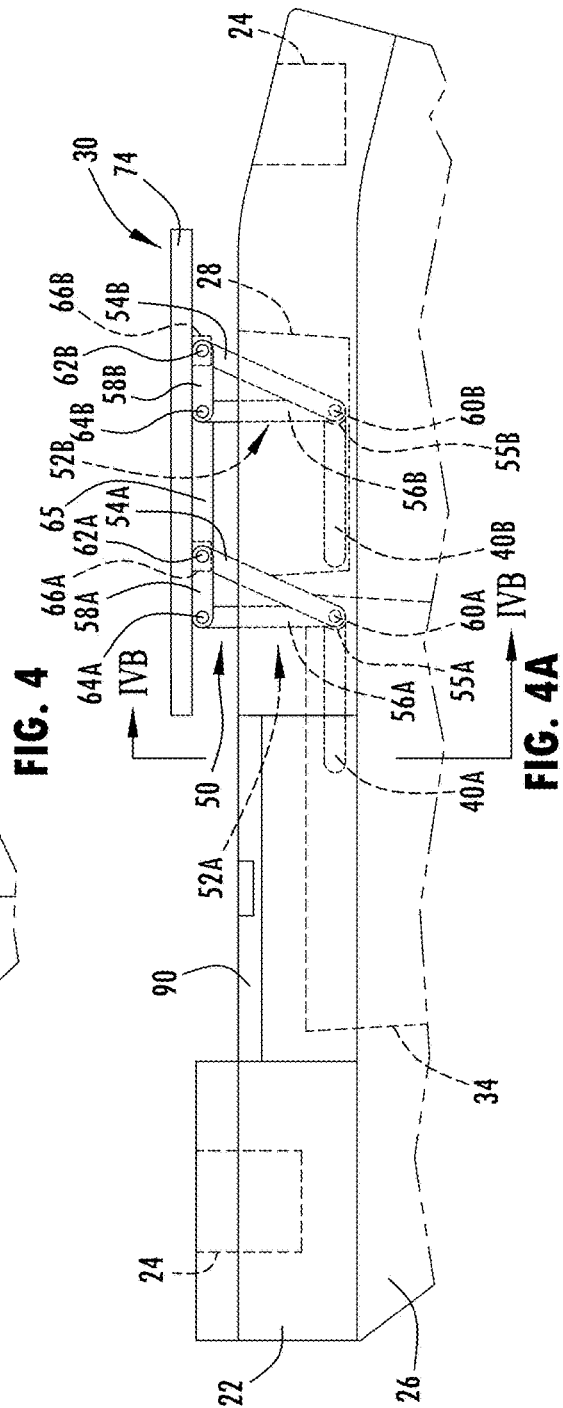
FIG. 4
FIG. 4A

VEHICLE CONSOLE HAVING DEPLOYABLE TABLE

FIELD OF THE DISCLOSURE

The present disclosure generally relates to passenger vehicle armrest consoles, and more particularly relates to a work table that is deployable from an armrest console within the cabin interior of a vehicle.

BACKGROUND OF THE DISCLOSURE

Motor vehicles are commonly configured with a cabin interior having passenger seating for transporting passengers. In some situations, passengers may want a work surface in the vehicle. It would be desirable to provide for a convenient way to store and deploy a work surface within the cabin interior of a vehicle.

SUMMARY OF THE DISCLOSURE

According to a first aspect of the present disclosure, an armrest assembly for a vehicle is provided. The armrest assembly includes a housing, a track system coupled to the housing, an armrest having a deployable table and supported by the housing, and a linkage assembly coupling the armrest to the track system, wherein the armrest is configured to slide forward on the track system and to rotate upward via the linkage assembly to deploy the deployable table.

Embodiments of the first aspect of the present disclosure can include any one or a combination of the following features:
  the armrest assembly is located on a console;
  the housing defines a storage bin;
  the armrest defines a cover extendable over the storage bin;
  the console is a center console;
  the deployable table comprises a plurality of panels that pivot between a stacked position and a deployed position;
  the linkage assembly comprises at least one pivotable brace mechanism three-bar linkage on each of opposite lateral sides of the housing;
  the linkage assembly comprises first and second pivotable brace mechanisms and an interconnecting link forming a three-bar linkage on each of the opposite lateral sides of the housing;
  at least one auxiliary armrest pivotally coupled to the housing and configured to pivot between a stowed position and a use position when the deployable table is deployed;
  the at least one auxiliary armrest comprises a first auxiliary armrest on one side of the housing and a second auxiliary armrest on an opposite side of the housing, wherein each of the first and second auxiliary armrests is pivotally coupled to the housing and configured to pivot between the stowed positon and the use position when the deployable table is deployed;
  the track system comprises first and second tracks extending generally longitudinally within a vehicle; and
  the linkage assembly further comprises first and second rollers operatively coupled to the first and second tracks.

According to a second aspect of the present disclosure, an armrest center console for a vehicle is provided. The armrest center console includes a housing defining a storage bin, a track system having first and second tracks provided on opposite sides of the housing, an armrest cover assembly supported on the housing and configured to cover the storage bin and having a deployable table, and a linkage assembly coupling the armrest cover assembly to the first and second rails, wherein the armrest cover assembly is configured to slide forward on the first and second tracks and to rotate upward via the linkage assembly to deploy the deployable table.

Embodiments of the second aspect of the present disclosure can include any one or a combination of the following features:
  the deployable table comprises a plurality of panels that pivot between a stacked position and a deployed position;
  the linkage assembly comprises at least one pivotable three-bar linkage on each of opposite lateral sides of the housing;
  at least one auxiliary armrest pivotally coupled to the housing and configured to pivot between a stowed position and a use position when the deployable table is deployed;
  the at least one armrest comprises a first auxiliary armrest on one side of the housing and a second auxiliary armrest on an opposite side of the housing, wherein each of the first and second auxiliary armrests is pivotally coupled to the housing and configured to pivot between the stowed positon and the use position when the deployable table is deployed;
  the linkage assembly comprises first and second pivotable brace mechanisms and an interconnecting link forming a three-bar linkage on each of the opposite lateral sides of the housing;
  the linkage assembly further comprises first and second rollers operatively coupled to the first and second tracks; and
  the first and second tracks extend generally longitudinally within a vehicle.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 3 is a perspective view of the armrest cover assembly shown with the deployable table in a partially deployed third position;

FIG. 3A is a cross-sectional view of the center console taken through line IIIA-IIIA of FIG. 3;

FIG. 4 is a perspective view of the armrest cover assembly shown with the deployable table in a fully deployed fourth position;

FIG. 4A is a cross-sectional view of the center console taken through line IVA-IVA of FIG. 4.

DETAILED DESCRIPTION OF PREFERRED EMBODIMENTS

Figure 1:
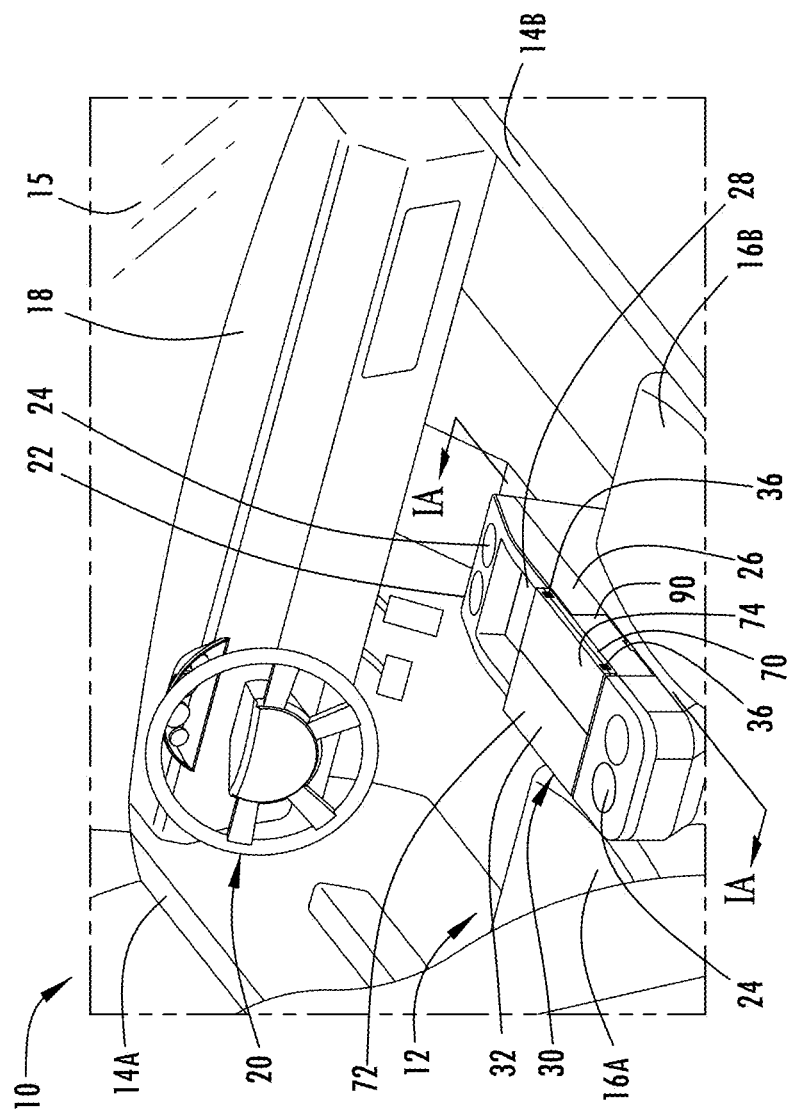
FIG. 1 is a perspective view of a front portion of a cabin interior of a motor vehicle having a deployable table within an armrest cover assembly of a center console in a stowed first position, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having an armrest assembly with a deployable table. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers including a driver of the vehicle 10. The motor vehicle 10 has a vehicle body that generally defines a cabin interior 12. The cabin interior 12 may contain various features and trim components within the vehicle body. The cabin interior 12 is shown having an arrangement of passenger seats including a first driver seat 16A and a second passenger seat 16B which may be configured as captain seats, for example, arranged as a front row of seats. The vehicle 10 may also include additional seating such as a second row and further rows of seating as is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers.

The motor vehicle 10 is illustrated having the driver seat 16A located rearward of a steering wheel assembly 20 and a front dashboard 18 that generally defines an interior trim panel component generally located at or proximate to a front portion of the cabin interior 12 which is generally vehicle-rearward of a front windshield 15. The dashboard 18 may include various trim panel components and instruments and may also be referred to as an instrument panel. Located vehicle-forward of the driver seat 16A and rearward of the dashboard 18 is the steering wheel assembly 20 which has a steering column and steering hand wheel configured to be engaged by a driver seated in the driver seat 16A and rotated to steer vehicle road wheels and hence steer the vehicle 10.

The driver seat 16A is illustrated located on one lateral side of the cabin interior 12 of the vehicle 10 proximate to a driver side entry door 14A. The passenger seat 16B is illustrated located on the opposite lateral side of the cabin interior 12 proximate to a passenger side entry door 14B. Located between the driver seat 16A and the passenger seat 16B is a center console 22 which generally extends forward to or proximate to the dashboard 18 and rearward towards a rear row of seating where the rear end of the center console 22 may have cupholders 24 and control inputs that may be accessed by passengers seated in the rear row of seating. The center console 22 may include a plurality of cupholders 24 and storage bins 28 both near the front and rear ends thereof. In addition, the center console 22 may have a transmission shifter such as a control knob or arm that generally extends upward such that it is accessible to the driver.

The center console 22 is an armrest center console and is generally supported by the underlying vehicle floor on the bottom side thereof and disposed between the driver and passenger seats 16A and 16B and provides an armrest surface 32 on the top side thereof. The center console 22 includes a housing 26 having walls that defines a storage bin or compartment 34. The center console 22 includes an armrest assembly 30 also referred to as an armrest cover assembly operatively coupled to an upper side of the housing 26 and positioned proximate to or over the top of the storage compartment 34. The armrest assembly 30 provides a cover and thus also operates as a cover assembly to cover the top open end of the storage compartment 34. The armrest assembly 30 may pivot or slide between open console and closed console positions. The armrest assembly 30 also provides an armrest surface 32 on the top side thereof. As such, an occupant such as a driver or passenger seated in the driver seat 16A or passenger seat 16B may utilize the armrest surface 32 to support the arm of the occupant when the armrest assembly 30 is in the first position shown in FIG. 1. Additionally, the armrest assembly 30 has a deployable table that provides a work surface when deployed. While the armrest assembly 30 having the deployable table is shown located on a center console 22 positioned in a first row of seating in the vehicle 10, it should be appreciated that the armrest assembly 30 may be located elsewhere within the vehicle, such as between two occupant seats which may be second or third rows of seating, for example.

Figure 1A:
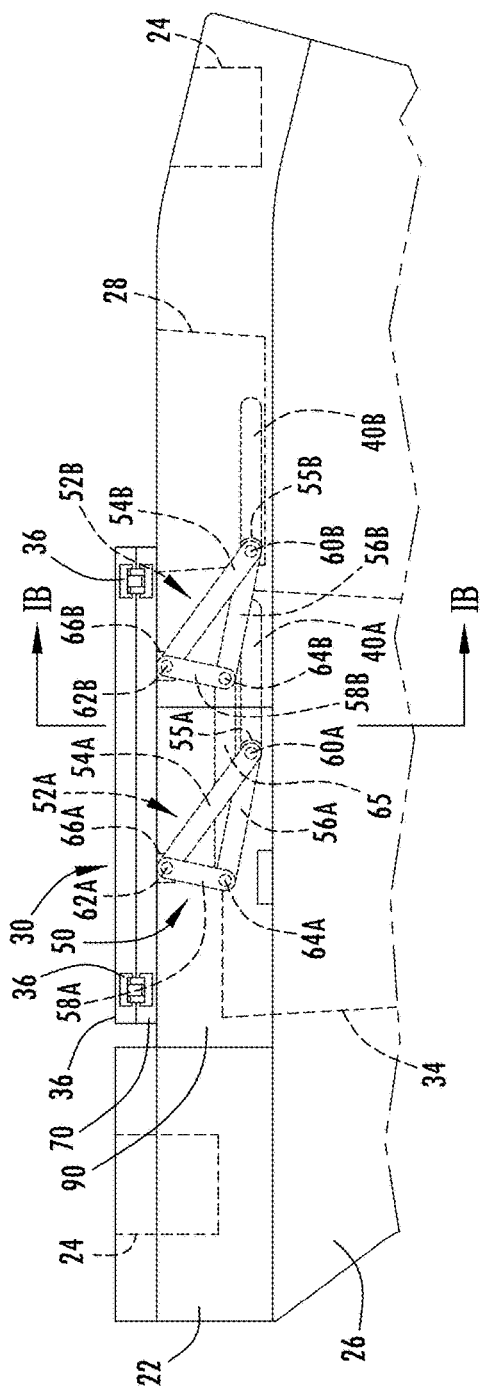
FIG. 1A is a cross-sectional view of the center console taken through line IA-IA of FIG. 1.
Figure 1B:
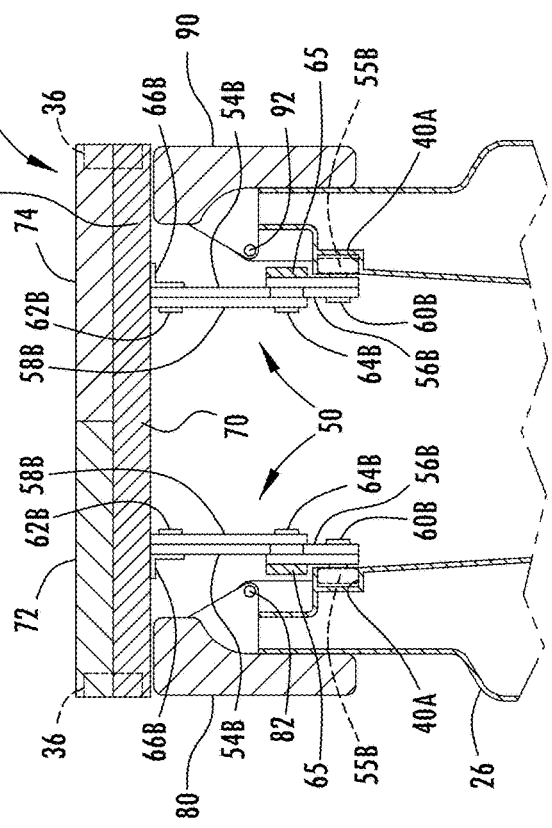
FIG. 1B is a cross-sectional view of the center console taken through line IB-IB of FIG. 1A.

The armrest assembly 30 with the upper armrest surface 32 is operatively coupled to a linkage assembly 50 as seen in FIGS. 1A and 1B. The linkage assembly 50 couples the armrest assembly 30 to a track system such that the armrest assembly is configured to slide forward on the track system and rotate to extend upward and vehicle forward. As seen in FIG. 1A, the track system includes a first track 40A provided on the housing 26 and a second track 40B provided on the housing 26. The first track 40A and the second track 40B extend generally longitudinally on one lateral side of the housing 26 and are substantially aligned to be parallel with one another and generally coaxial, according to one example. It should be appreciated that the track system likewise includes a first track 40A and a second track 40B on the opposite lateral side of the housing 26 as seen in FIG. 1B. It should be appreciated that the track system may otherwise be configured to employ connected tracks or to include a single track on each side, according to another embodiment. Each of the first and second tracks 40A and 40B may be implemented as a rail or a slot to allow the linkage assembly 50 to translate vehicle forward for deployment and rearward to be stowed.

The linkage assembly 50 is shown operatively coupled to the first and second tracks 40A and 40B. The linkage assembly 50 includes a first pivotable bracket or brace mechanism 52A operatively coupled to the first track 40A and a second pivotable bracket or brace mechanism 52B operatively coupled to the second track 40B. The first brace mechanism 52A includes three linkage bars, referred to as a first linkage bar 54A, a second linkage bar 56A and a third linkage bar 58A, all operatively coupled in a triangular shape to each other via pivot pins 60A, 62A and 64A. Pivot pin 60A is further operatively coupled to a roller bearing such as a roller 55 shown as a wheel that is operatively coupled to the first track 40A to allow the roller 55 to slide longitudinally within the first track 40A between a rearward position shown in FIG. 1A, and a forward position. While the first pivotable brace mechanism 52A is shown having three interconnected linkage bars, it should be appreciated that the brace mechanism 52A may otherwise be configured as a single unitary stamped part, for example, that allows the armrest assembly 30 to slide forward and pivot upwards and to return to the original stowed position.

The second brace mechanism 52B likewise includes three linkage bars including a first linkage bar 54B, a second linkage bar 56B, and a third linkage bar 58B, all connected in a triangular shape and interconnected via pivot pins 60B, 62B and 64B. The first pivot pin 60B is operatively coupled to a roller bearing such as a roller 55 shown as a wheel that is operatively coupled to the first track 40A to allow the roller 55 to translate longitudinally between the rear position shown in FIG. 1A and a forward position. While the second pivotable brace mechanism 52B is shown having three interconnected linkage bars, it should be appreciated that the brace mechanism 52B may otherwise be configured as a single unitary stamped part, for example, that allows the armrest assembly 30 to slide forward and pivot upwards and to return to the original stowed position.

The first and second brace mechanisms 52A and 52B are connected on the top side thereof via respective first and second brackets 66A and 66B to an underside of the armrest assembly 30 that forms a deployable table. As seen in FIG. 1B, the deployable table includes a first panel 70 and second and third panels 72 and 74 stowed on top of the first panel 70. The second and third panels 72 and 74 pivot upward and laterally outward from the stowed position shown in FIG. 3 and an outward extended use position shown in FIG. 4. In doing so, the second and third panels 72 and 74 pivot upward and outward via hinges 36 to form a substantially planar table with a work surface in the deployed position as seen in FIG. 4.

The linkage assembly 50 further includes a stabilizing link 65 connected at opposite ends to pins 64A and 64B to interconnect the first and second pivotable brace mechanisms 52A and 52B. The linkage assembly 50 has a stabilizing link 65 on each of the opposite lateral sides of the housing 26. The stabilizing link 65 allows the first and second pivotable brace mechanisms 52A and 52B to translate and rotate in unison. The first and second pivotable brace mechanisms 52A and 52B and the interconnecting stabilizing link 65 form a three-bar linkage of each of the opposite lateral sides of the housing.

Referring back to FIG. 1B, the center console 22 further includes first and second flip-up auxiliary armrests 80 and 90 which are pivotally connected via pivot pins 82 and 92 on opposite lateral sides of the housing 26. The first and second flip-up auxiliary armrests 80 and 90 may be stowed in a vertical position as seen in FIG. 1B when the armrest assembly 30 is in the first position. When the armrest assembly 30 is moved vehicle forward to a position with the table deployed, the flip-up auxiliary armrests 80 and 90 may be pivoted via pivot pins 82 and 92, respectively, to a horizontal position to provide auxiliary armrest supports for the driver and passenger of the vehicle 10 when the deployable table is deployed forward and outward as seen in FIG. 4. The first and second flip-up auxiliary armrests 80 and 90 may be designed and located within the general finished shape of the center console design so as to be hidden and not detract from the appearance of the center console when the first and second flip-up auxiliary armrests 80 and 90 are stowed in the vertical position. The first and second flip-up auxiliary armrests 80 and 90 may be held in the stowed and deployed positions by using dual pawl latches that may be released by pulling on a center located latch handle in the armrest which would secure both the stowed and deployed positions, or by the use of an over-center spring mechanism which may be moved manually to start the pivot motion and a spring would snap the armrest rotation the remaining distance into the stowed or deployed position. As such, the first and second flip-up auxiliary armrests 80 and 90 may be manually deployable and stowed. However, it should be appreciated that the first and second flip-up auxiliary armrest 80 and 90 may otherwise be actuated by an actuator, such as a motor or may employ other spring-assisted mechanisms.

Figure 2:
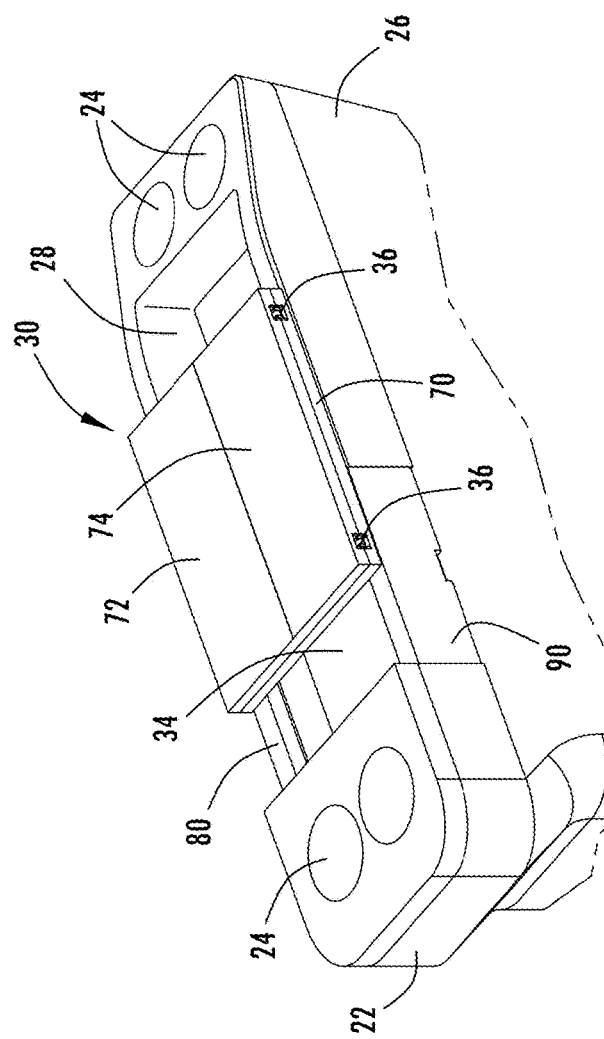
FIG. 2 is a perspective view of the armrest cover assembly shown with the deployable table in a partially deployed second position.
Figure 2A:
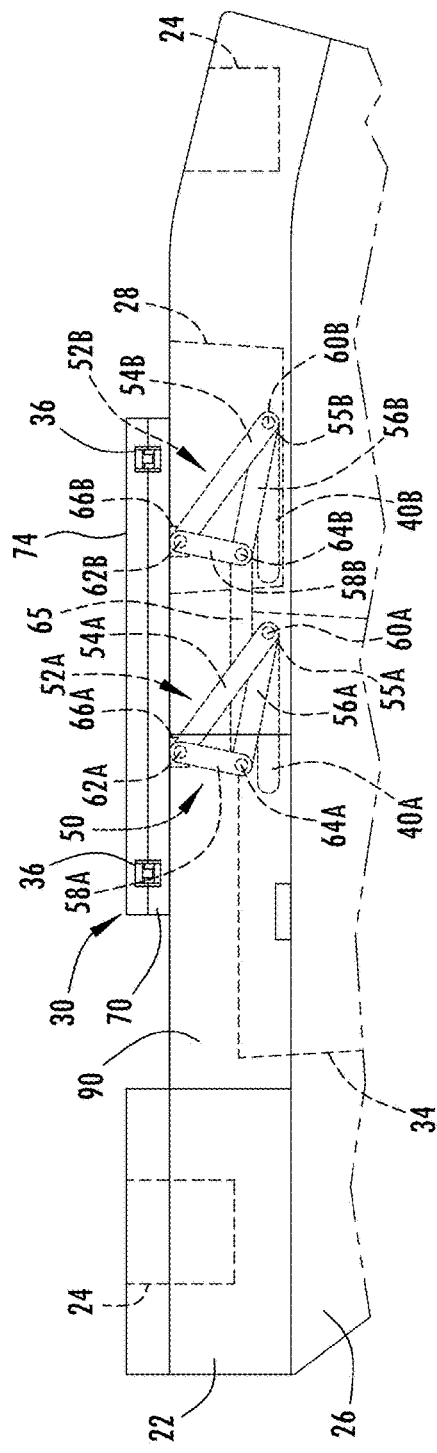
FIG. 2A is a cross-sectional view of the center console taken through line IIA-IIA of FIG. 2.

The armrest assembly 30 serves as a cover to cover or close the top of the storage compartment 34 and serves as an armrest for use by the driver and/or passenger of the vehicle 10 and further provides for a deployable table that may be utilized as a work surface. In order to deploy the deployable table, the armrest assembly 30 is moved forward by applying force to slide the rollers 55 engaged on the first and second tracks 40A and 40B from an initial rearward stowed position as shown in FIGS. 1-1B to a vehicle forward partial deployed position as seen in FIGS. 2 and 2A where the rollers 55 stop when engaged to the ends of first and second tracks 40A and 40B. In the partial deployed second position, the linkage assembly 50 is translated via rollers 55 and pivot pins 60A and 60B to engage the forward end of the respective first and second tracks 40A and 40B to a vehicle forward position. Once the pivot pins 60A and 60B reach the forward end of the first and second tracks 40A and 40B, the armrest assembly can be forcibly pivoted upward and forward in a clockwise movement as seen in FIGS. 3 and 3A to a partially deployed third position. The pivoting motion may be achieved with the use of force applied by a user, a spring-assisted motion, or a powered mechanism motion such as an electric motor, for example. In the third position, second linkage bars 56A and 56B are rotated to a substantially vertical position while the short third linkage bars 50A and 50B and the stabilizing bar 65 are substantially horizontal and abut the bottom surface of panel 70. As such, further rotation of the deployable table in the vehicle forward direction is prevented.

Next, the deployable table may be extended in size as seen in FIGS. 4 and 4A by pivoting upper panels 72 and 74 laterally outward relative to lower panel 70. The extended table thereby provides an enhanced size work surface. It should be appreciated that the table may be deployed and utilized when the vehicle is stopped in park and not moving or operating. It is anticipated that technology and the regulatory framework may evolve in the future to where using the deployable table in a moving vehicle becomes safe and permissible.

Figure 4B:
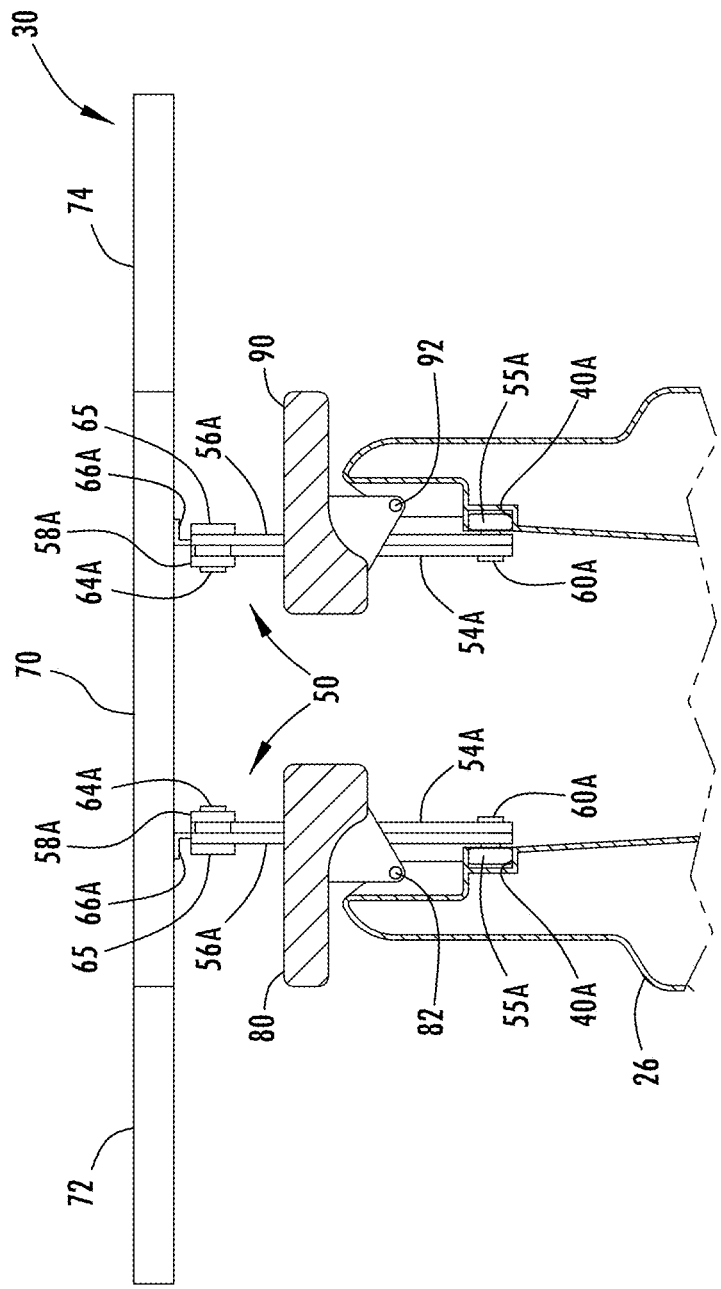
FIG. 4B is a cross-sectional view of the center console taken through line IVB-IVB of FIG. 4A.

In addition, as seen in FIGS. 4 and 4B, the first and second auxiliary flip-up armrests 80 and 90 may be rotated 90° from the vertical stowed position to a horizontal position rearward of the deployed table. As such, the first and second auxiliary flip-up armrests 80 and 82 provide armrest surfaces on opposite lateral sides of the housing 26 that accommodate the arm of each driver or passenger of the vehicle 10 in a position that is generally vehicle rearward of the deployable table when the table is deployed.

It should be appreciated that the deployable table may be folded back up to a stacked configuration and moved rearward by rotating and sliding to the stowed position by reversing the movement of the linkage assembly 50 as described herein. As such, the deployable table may be deployed when a work surface is needed and may be stowed within the armrest assembly when not in use.

Accordingly, the armrest assembly 30 advantageously provides for a deployable table that may be stowed in the armrest assembly 30 and deployed from an armrest position to provide an expanded work surface on the vehicle 10 when the vehicle 10 is not operating.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An armrest assembly for a vehicle, the armrest assembly comprising:
   a housing;
   a track system coupled to the housing;
   an armrest having a deployable table and supported by the housing; and
   a linkage assembly coupling the armrest to the track system, wherein the armrest is configured to slide forward on the track system and to rotate upward via the linkage assembly to deploy the deployable table.

2. The armrest assembly of claim 1, wherein the armrest assembly is located on a console.

3. The armrest assembly of claim 2, wherein the housing defines a storage bin.

4. The armrest assembly of claim 3, wherein the armrest defines a cover extendable over the storage bin.

5. The armrest assembly of claim 4, wherein the console is a center console.

6. The armrest assembly of claim 1, wherein the deployable table comprises a plurality of panels that pivot between a stacked position and a deployed position.

7. The armrest assembly of claim 1, wherein the linkage assembly comprises at least one pivotable brace mechanism on each of opposite lateral sides of the housing.

8. The armrest assembly of claim 7, wherein the linkage assembly comprises first and second pivotable brace mechanisms and an interconnecting link forming a first and second three-bar linkage on each of the opposite lateral sides of the housing.

9. The armrest assembly of claim 1 further comprising at least one auxiliary armrest pivotally coupled to the housing and configured to pivot between a stowed position and a use position when the deployable table is deployed.

10. The armrest assembly of claim 9, wherein the at least one auxiliary armrest comprises a first auxiliary armrest on one side of the housing and a second auxiliary armrest on an opposite side of the housing, wherein each of the first and second auxiliary armrests is pivotally coupled to the housing and configured to pivot between the stowed positon and the use position when the deployable table is deployed.

11. The armrest assembly of claim 1, wherein the track system comprises first and second tracks extending generally longitudinally within a vehicle.

12. The armrest assembly of claim 11, wherein the linkage assembly further comprises first and second rollers operatively coupled to the first and second tracks.

13. An armrest center console for a vehicle, the armrest center console comprising:
a housing defining a storage bin;
a track system having first and second tracks provided on opposite sides of the housing;
an armrest cover assembly supported on the housing and configured to cover the storage bin and having a deployable table; and
a linkage assembly coupling the armrest cover assembly to the first and second rails, wherein the armrest cover assembly is configured to slide forward on the first and second tracks and to rotate upward via the linkage assembly to deploy the deployable table.

14. The armrest center console of claim 13, wherein the deployable table comprises a plurality of panels that pivot between a stacked position and a deployed position.

15. The armrest center console of claim 13, wherein the linkage assembly comprises at least one pivotable three-bar linkage on each of opposite lateral sides of the housing.

16. The armrest center console of claim 13 further comprising at least one auxiliary armrest pivotally coupled to the housing and configured to pivot between a stowed position and a use position when the deployable table is deployed.

17. The armrest center console of claim 16, wherein the at least one armrest comprises a first auxiliary armrest on one side of the housing and a second auxiliary armrest on an opposite side of the housing, wherein each of the first and second auxiliary armrests is pivotally coupled to the housing and configured to pivot between the stowed positon and the use position when the deployable table is deployed.

18. The armrest center console of claim 17, wherein the linkage assembly comprises first and second pivotable brace mechanisms and an interconnecting link forming a three-bar linkage on each of the opposite lateral sides of the housing.

19. The armrest center console of claim 13, wherein the linkage assembly further comprises first and second rollers operatively coupled to the first and second tracks.

20. The armrest center console of claim 13, wherein the first and second tracks extend generally longitudinally within a vehicle.

\* \* \* \* \*